(12) United States Patent
Poisner et al.

(10) Patent No.: US 7,093,115 B2
(45) Date of Patent: Aug. 15, 2006

(54) METHOD AND APPARATUS FOR DETECTING AN INTERRUPTION IN MEMORY INITIALIZATION

(75) Inventors: David I. Poisner, Folsom, CA (US); Michael N. Derr, Folsom, CA (US); Darren Abramson, Folsom, CA (US); Zohar Bogin, Folsom, CA (US); Adit Tarmaster, Folsom, CA (US); William Knolla, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 569 days.

(21) Appl. No.: 10/326,394

(22) Filed: Dec. 19, 2002

(65) Prior Publication Data

US 2004/0123088 A1    Jun. 24, 2004

(51) Int. Cl.
*G06F 15/177* (2006.01)
*G06F 11/22* (2006.01)

(52) U.S. Cl. ............................ 713/1; 714/42

(58) Field of Classification Search .............. 713/1, 713/2, 100; 714/42, 48
See application file for complete search history.

(56) References Cited

U.S. PATENT DOCUMENTS

| 4,665,501 | A  | * | 5/1987  | Saldin et al. ................. 710/8 |
| 5,345,583 | A  | * | 9/1994  | Davis ......................... 714/23 |
| 6,185,696 | B1 | * | 2/2001  | Noll ............................. 714/6 |
| 6,487,464 | B1 | * | 11/2002 | Martinez et al. ............. 700/79 |
| 6,571,333 | B1 | * | 5/2003  | Jain et al. ..................... 713/2 |
| 6,938,164 | B1 | * | 8/2005  | England et al. ............. 713/193 |

OTHER PUBLICATIONS

Phoenix, PhoenixBIOS 4.0 Release 6.0 POST Tasks and Beep Codes, 1997, pp. 1-4.*

* cited by examiner

*Primary Examiner*—Dennis M. Butler
(74) *Attorney, Agent, or Firm*—Sharon Wong

(57) ABSTRACT

Embodiments of the present invention provide a method and apparatus for detecting an interruption in memory initialization. A status bit for indicating whether memory initialization was interrupted or not is stored in a register. A basic input/output system (BIOS) sets the status bit prior to initialization and clears the status bit after initialization. The status bit cannot be reset by a standard platform reset. In operation, as the system is reset or turned on and prior to initialization, the BIOS checks the status bit to detect possible improper memory initialization. When the status bit is set, the BIOS concludes that a memory initialization had not completed and thus might be incorrect. The BIOS then causes power to be cycled to memory and any other steps needed are taken to return the memory to a functional state.

45 Claims, 5 Drawing Sheets

METHOD AND APPARATUS FOR DETECTING AN INTERRUPTION IN MEMORY INITIALIZATION

BACKGROUND

Memory devices and memory subsystems typically have certain initialization steps and/or register values that need to be programmed prior to normal operation. Certain events can cause the initialization to be done improperly including, but not limited to, a reset occurring during the middle of initialization.

If the memory initialization process is interrupted, the memory may wind up in a state in which operation is unpredictable. Memory initialization could be interrupted due to asynchronous resets, such as the user pressing a reset button or reset messages received from the local area network (LAN). The only way to return the memory to a proper state is to power cycle the memory for a sufficiently long time. After reset, there is no direct method for the BIOS to know if the memory is in an unpredictable state. It could infer this by performing extensive memory testing, however that takes a significant time and will slow the boot process.

DETAILED DESCRIPTION

Figure 1:
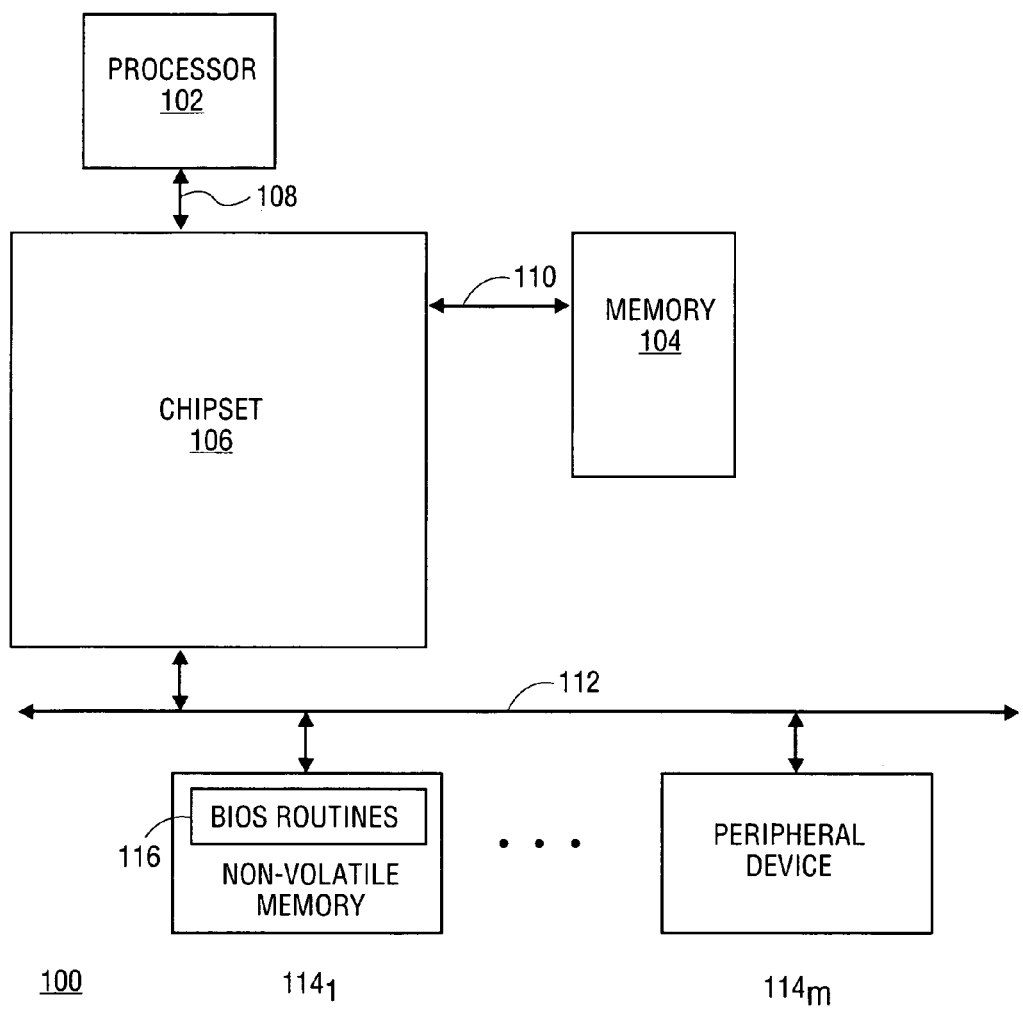
FIG. 1 illustrates a diagram of an exemplary system implementing one embodiment for detecting improper memory initialization.

Embodiments of the present invention provide a method and apparatus for detecting an interruption in memory initialization. A status bit for indicating whether memory initialization was interrupted or not is stored in a register. A basic input/output system (BIOS) sets the status bit prior to initialization and clears the status bit after initialization. The status bit cannot be reset by a standard platform reset. In operation, as the system is reset or turned on and prior to initialization, the BIOS checks the status bit to detect possible improper memory initialization. When the status bit is set, the BIOS concludes that a memory initialization had not completed and thus might be incorrect. The BIOS then causes power to be cycled to memory and any other steps needed are taken to return the memory to a functional state. Extensive testing for improper initialization can be skipped for most cases and average boot time decreased. The memory does not need to be cycled on most boots, since the status bit will indicate if the prior memory initialization was interrupted.

In the detailed description, numerous specific details are set forth in order to provide a thorough understanding of the present invention. However, it will be understood by those skilled in the art that the present invention may be practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as processing or computing or calculating or determining or the like, refer to the action and processes of a computer or computing system, or similar electronic computing device, that manipulate and transform data represented as physical (electronic) quantities within the computing system s registers and/or memories into other data similarly represented as physical quantities within the computing system s memories, registers or other such information storage, transmission or display devices.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

For illustrative purposes, embodiments of the present invention are discussed utilizing BIOS, a bus, memory controller and memory. Embodiments of the present invention are not limited to such a configuration though. For example, another software code maybe used in place of the BIOS to set, clear and inquire the bits described herein.

FIG. 1 illustrates a diagram of an exemplary system implementing one embodiment 100 for detecting an interruption in memory initialization. Detection of an interruption in memory initialization can be caused by various events. The system includes processor 102 and memory 104 that are coupled to chipset 106. Chipset 106 operates as an interface between a plurality of buses, namely a host bus 108, a memory bus 110 and a bus 112.

Bus 112 provides a communication path between (i) chipset 106 and (ii) one or more peripheral devices 114.sub.m ("m" being a positive whole number). Bus 112 may be a multiplexed bus such as a Peripheral Component Interconnect (PCI) bus, an Industry Standard Architecture (ISA) bus or any other type of bus architecture. It is contemplated that bus 112 includes a single bus (e.g., a PCI bus) as shown, or alternatively, multiple buses coupled together through bridge circuitry. In the later illustrative example, each peripheral device 114.sub.m would be coupled to at least one of the multiple buses. Storage device 114.sub.1 contains non-volatile memory including Basic Input/Output System (BIOS) code 116 for execution by processor 102.

One skilled in the art will recognize that memory 104 can be comprised of various types of memory and any references to a particular type of memory is for illustrative purposes only. For example, memory 104 can reference DRAM, SDRAM (Synchronous DRAM) or RDRAM (RAMBUS DRAM), FLASH or DDR (Double Data Rate synchronous DRAM). Embodiments of the present invention can be implemented in a variety of systems (SDRAM, FLASH, DRAM, DDR, etc) and is backward compatible with current memory management techniques.

The chipset 106 includes register 118 which may be used for initialization purposes, including detecting interruption of initialization. The register 118 typically includes other fields to specify information about initialization operations, and some of the operations specified by the operands involve data exchange with devices in the memory subsystem (e.g., writing and reading of memory device control registers or otherwise generating control signals). BIOS code (i.e., computer instructions) causing the system to implement the disclosed techniques may be programmed into the storage device 114.sub.1 in several ways. The BIOS may be programmed when the system is manufactured or may be later delivered via a computer readable medium through an input device (not shown).

Using the presently disclosed techniques, detecting an interruption in memory initialization may be performed. A status bit in a register is evaluated by software. The status bit can be set by software prior to initialization and then cleared after initialization is complete. Software, such as BIOS upon boot, checks whether the status bit is set or not. A set status bit indicates an interruption in memory initialization. For example, memory initialization may have been in progress but interrupted when the last reset occurred. In such case, the BIOS issues commands to the chipset, typically the I/O controller, to power cycle the memory and take any steps necessary to recover. If the status bit is not set, memory initialization proceeds as normal. The memory does not need to be power cycled.

Figure 2:
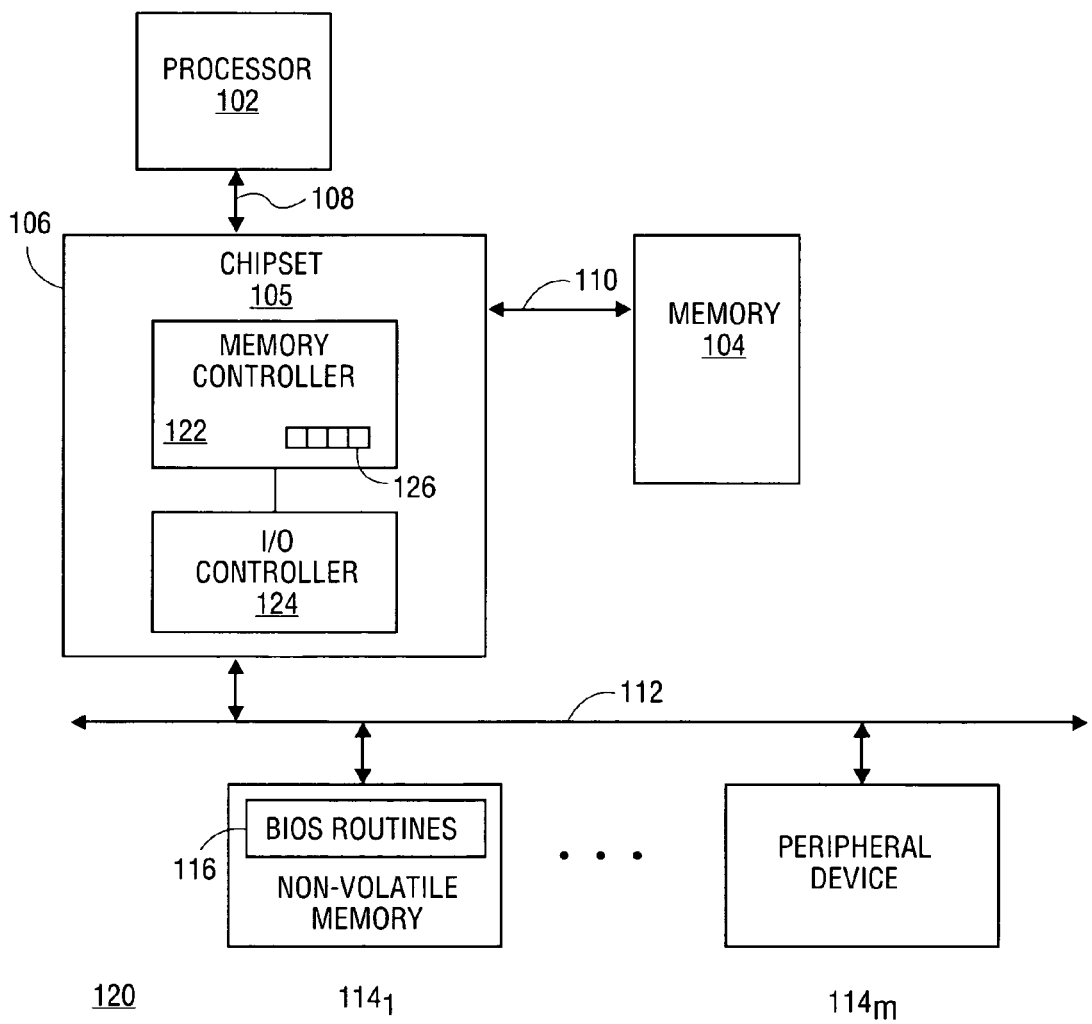
FIG. 2 illustrates a diagram of an embodiment for detecting improper memory initialization using a status bit.

FIG. 2 illustrates a diagram of an embodiment 120 for detecting an interruption in memory initialization using a status bit. The location of any status bit is arbitrary and can be located anywhere in the platform as long as it unable to be reset by the platform reset any reset for which initialization interruption is to be detected. For example, a status bit could be located anywhere on the chipset 106 including the memory controller 122 or I/O controller 124. A status bit could also be located off the chipset 106, such as non-volatile memory 114.sub.1 or on other module such as peripheral device 114.sub.m that can includes flash memory. As noted above, a status bit for indicating whether memory initialization was interrupted or not is stored in a register, such as register 126. The status bit may be a field of the register 126. In some embodiments, the BIOS may perform this function by writing to a field in an initialization control register. Alternatively, other registers may be used, or general purpose memory locations either within or without the memory controller may be the control register. In fact, the register 126 may be any storage location accessible to the memory controller prior to memory initialization that is capable of storing sufficient bits.

Figure 3:
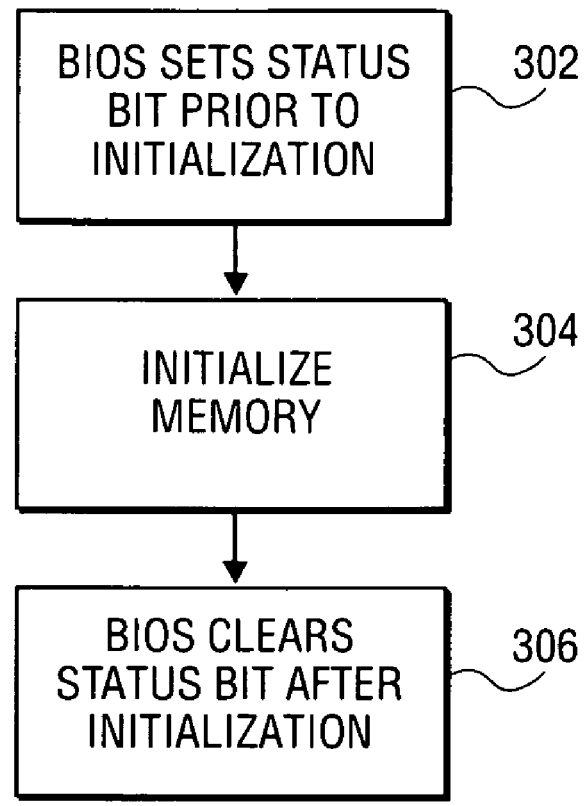
FIG. 3 illustrates a flow diagram of one embodiment for initializing memory.

FIG. 3 illustrates a flow diagram of one embodiment 300 for initializing memory. In particular, the status bit is set prior to memory initialization and cleared after initialization is complete.

In step 302, the software, such as BIOS, sets the status bit prior to memory initialization. In a typical implementation, a software write is used to set the status bit to 1.

In step 304, the memory is initialized. The initialization operation may commence automatically when the status bit is set.

In step 306, the software clears the status bit after initialization. In a typical implementation, a software write is used to clear the status bit to 0. Completion of the initialization operation may be signaled in any manner sufficient to alert or inform the software (i.e. BIOS) that the initialization operation is complete. In another embodiment, the memory controller may automatically clear the status bit when the initialization operation completes.

Figure 4:
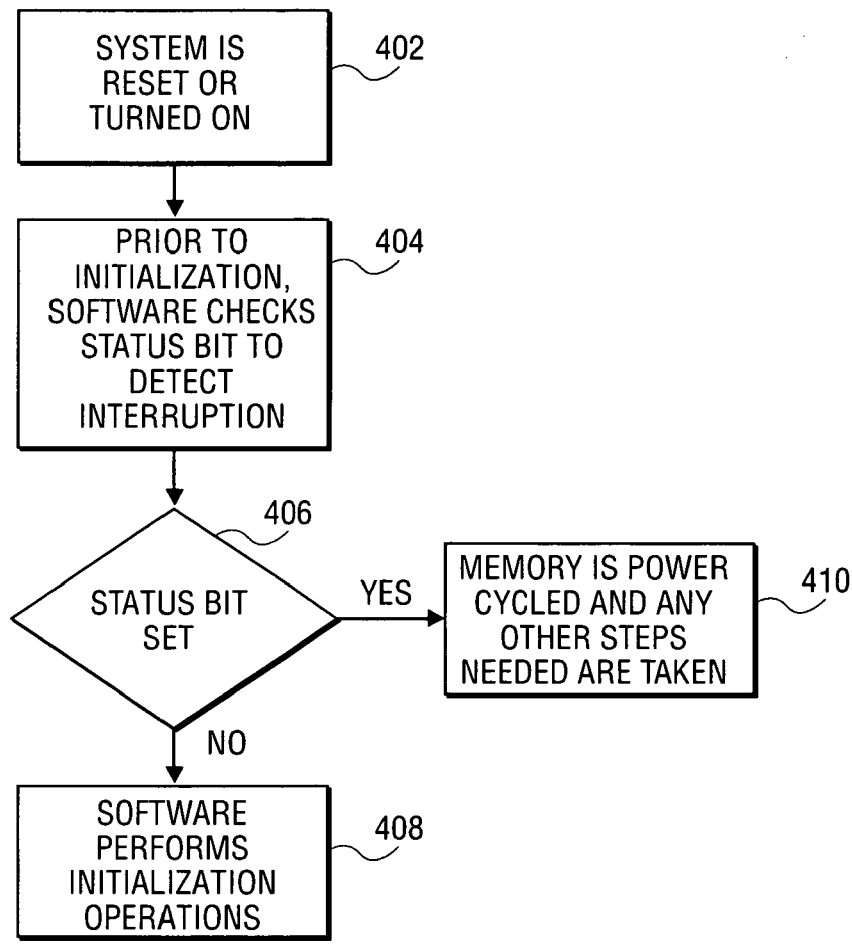
FIG. 4 illustrates a flow diagram of one embodiment for executing memory initialization.

FIG. 4 illustrates a flow diagram of one embodiment 400 for executing memory initialization.

In step 402, the system is reset or turned on.

In step 404, prior to initialization, the software (for example, BIOS) checks the status bit to detect an interruption in memory initialization.

In step 406, the software determines if the status bit is set or not (i.e. is clear).

In step 408, if the status bit is not set, the software performs the typical initialization operations. For example, depending on the type of memory and the intended mode of usage, initialization operations will be selected by the BIOS in a particular sequence. Since the status bit does not indicate an interruption in memory initialization, the memory does not need to be power cycled.

In step 410, if the status bit is set, the memory is power cycled and any other steps needed are taken. When the status bit is set, the BIOS concludes that a memory initialization was in progress but interrupted when the last reset occurred.

Figure 5:
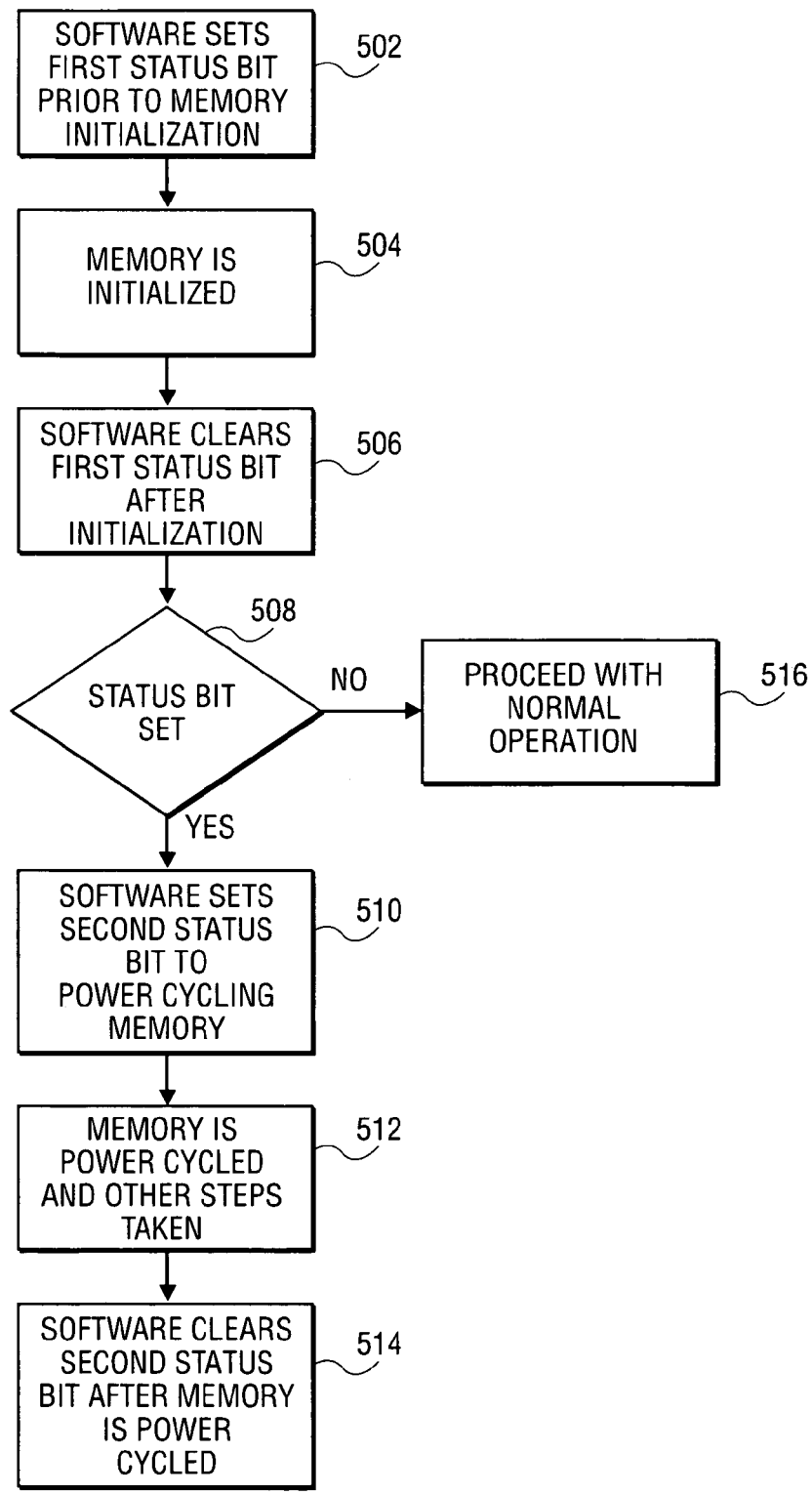
FIG. 5 is a flow diagram of an embodiment to detect an interruption in memory initialization and memory power cycling.

FIG. 5 is a flow diagram of an embodiment 500 to detect an interruption in memory initialization and memory power cycling. A first bit is set prior to memory initialization and a second bit is set prior to the memory being power cycled.

In particular, a first bit is set prior to memory initialization. The BIOS clears the first status bit after initialization. However, if a power cycle is required, a second bit is set prior to the memory being power cycled. The second bit indicates whether the memory has been power cycled or not.

The use of a second bit to is especially advantageous when the first and second bits are stored off the chipset, such as in a memory connected to the chipset. The memory can be comprised of nonvolatile (NV) memory such as, for example, flash memory, read only memory (ROM), erasable programmable read-only memory (EPROM), or electrically erasable programmable read-only memory (EEPROM). In a configuration where a bit for detecting improper memory utilization is stored on the chipset, the bit is typically cleared by the power cycle. Therefore, a second bit to indicate whether the memory was power cycled is not necessary.

In step 502, the software sets the first status bit prior to memory initialization. In a typical implementation, a BIOS software write is used to set the status bit to 1.

In step 504, the memory is initialized. The initialization operation may commence automatically when the first status bit is set by the BIOS.

In step 506, the software clears the first status bit after initialization. In a typical implementation, a BIOS software write is used to clear the status bit to 0. Completion of the initialization operation may be signaled in any manner sufficient to alert or inform the BIOS that the initialization operation is complete.

In step 508, if the status bit is set, the software concludes that a memory initialization was in progress but interrupted when the last reset occurred.

In step 510, the software sets the second status bit prior to the memory being power cycled.

In step 512, the memory is power cycled and any other steps needed are taken.

In step 514, the software clears the second status bit after the memory is power cycled.

In step 508, if the status bit is not set, operations proceeds as normal (step 516).

Thus, as the system is reset or turned on and prior to initialization, the BIOS checks the first status bit to detect an interruption in memory initialization and the second status bit to detect if the memory was power cycled. The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system comprising:
   a storage device coupled to a chipset including software code; and
   the chipset including a first bit to detect memory interruption wherein the first bit is set by the software code, and cannot be reset by a standard platform reset.

2. The system claimed in claim 1, wherein the software code includes a basic input output system (BIOS) code.

3. The system claimed in claim 1, wherein the software code sets the first bit prior to memory initialization and clears the first bit after memory initialization.

4. The system claimed in claim 1, wherein during a power-on reset condition, prior to initialization, the software code checks the first bit to detect possible improper memory initialization.

5. The system claimed in claim 4, wherein the first bit having a set state indicates that a memory initialization had not completed.

6. The system claimed in claim 5, wherein in response to the first bit having a set state, the software code causes power to be cycled to memory to return the memory to a functional state.

7. The system claimed in claim 6, wherein in response to the first bit not having a set state, the software code performs initialization operations.

8. The system claimed in claim 7, wherein the first bit is located on a chipset.

9. The system claimed in claim 8, wherein the chipset includes a memory controller.

10. The system claimed in claim 9, wherein the controller includes an input/output controller.

11. The system claimed in claim 10, wherein the chipset further comprises a register for storing the first bit.

12. The system claimed in claim 11, wherein the first bit is cleared by execution of the power cycle.

13. The system claimed in claim 7, wherein the first bit is located off a chipset.

14. The system claimed in claim 13, wherein the first bit is stored in non-volatile memory.

15. The system claimed in claim 14, wherein the non-volatile memory comprises flash memory.

16. The system claimed in claim 13, further comprising:
    a second bit to detect whether the memory has been power cycled.

17. The system claimed in claim 16, wherein the second bit is set prior to the memory being power cycled.

18. The system claimed in claim 17, wherein the second bit is cleared after the memory is power cycled.

19. A method for detecting interruption in memory initialization, comprising:
    setting a first bit prior to memory initialization to detect an interruption;
    clearing the first bit after memory initialization;
    during a power-on reset condition and prior to initialization, checking the first bit to detect possible improper memory initialization; and
    in response to the first bit having a set state, causing power to be cycled to memory to return the memory to a functional state.

20. The method claimed in claim 19, further comprising:
    in response to the first bit not having a set state, performing initialization operations.

21. The method claimed in claim 20, further comprising:
    storing the first bit in a register in a chipset.

22. The method claimed in claim 21, further comprising:
    clearing the first bit by execution of the power cycle.

23. The method claimed in claim 20, further comprising:
    storing the first bit off the a chipset.

24. The method claimed in claim 23, wherein storing the first bit off the chipset further comprises:
    storing the first bit in non-volatile memory.

25. The method claimed in claim 24, wherein storing the first bit in non-volatile memory further comprises:
    storing the first bit in flash memory.

26. The method claimed in claim 23, further comprising:
    setting a second bit to detect whether the memory has been power cycled.

27. The method claimed in claim 26, further comprising:
clearing the second bit after the memory has been power cycled.

28. A system comprising:
a chipset including a controller;
a memory; and
a storage device coupled to the chipset and controlled by a memory controller, the storage device including software code, wherein the chipset includes a memory initialization interruption status bit, the interruption status bit is set by software code, cleared by execution of a power cycle and cannot be reset by a standard platform reset.

29. The system claimed in claim 28, wherein the controller includes a memory controller and an input/output controller.

30. The system claimed in claim 28, wherein the chipset further comprises a register for storing the interruption detection bit.

31. The system claimed in claim 28, wherein the software code includes a basic input output system (BIOS) code.

32. The system claimed in claim 31, wherein the BIOS sets the interruption status bit prior to memory initialization and clears the interruption status bit after memory initialization.

33. The system claimed in claim 32, wherein during a power-on reset condition, prior to initialization, the BIOS checks the interruption status bit to detect possible improper memory initialization.

34. The system claimed in claim 33, wherein the interruption status bit having a set state indicates that a memory initialization had not completed.

35. The system claimed in claim 34, wherein in response to the interruption status bit having a set state, the BIOS causes power to be cycled to memory to return the memory to a functional state and the power cycle clears the interruption status bit.

36. The system claimed in claim 35, wherein in response to the interruption status bit not having a set state, the BIOS performs initialization operations.

37. A machine readable medium having stored therein a plurality of machine readable instructions executable by a processor to detect interruption in memory initialization, comprising:
instructions to set a first bit prior to memory initialization to detect an interruption;
instructions to clear the first bit after memory initialization;
during a power-on reset condition and prior to initialization, instructions to check the first bit to detect possible improper memory initialization; and
in response to the first bit having a set state, instructions to cause power to be cycled to memory to return the memory to a functional state.

38. The machine readable medium claimed in claim 37, further comprising:
in response to the first bit not having a set state, instructions to perform initialization operations.

39. The machine readable medium claimed in claim 38, further comprising:
instructions to store the first bit in a register in a chipset.

40. The machine readable medium claimed in claim 39, further comprising:
instructions to clear the first bit by execution of the power cycle.

41. The machine readable medium claimed in claim 38, further comprising:
instructions to store the first bit off a chipset.

42. The machine readable medium claimed in claim 41, wherein storing the first bit off the chipset further comprises:
instructions to store the first bit in non-volatile memory.

43. The machine readable medium claimed in claim 42, wherein storing the first bit in non-volatile memory further comprises:
instructions to store the first bit in flash memory.

44. The machine readable medium claimed in claim 41, further comprising:
instructions to set a second bit to detect whether the memory has been power cycled.

45. The machine readable medium claimed in claim 44, further comprising:
instructions to clear the second bit after the memory has been power cycled.

* * * * *